United States Patent [19]

Seppänen et al.

[11] Patent Number: 4,923,937

[45] Date of Patent: May 8, 1990

[54] METHOD OF POLMERIZING OLEFINES

[75] Inventors: Hanneli Seppänen; Outi Krause, both of Helsinki, Finland

[73] Assignee: Neste OY, Finland

[21] Appl. No.: 298,103

[22] Filed: Jan. 17, 1989

Related U.S. Application Data

[62] Division of Ser. No. 102,137, Sep. 29, 1987, Pat. No. 4,814,309.

[30] Foreign Application Priority Data

Sep. 29, 1986 [FI] Finland ................................. 863929

[51] Int. Cl.$^5$ ............................................. C08F 4/64
[52] U.S. Cl. ................... 526/124; 526/125; 526/351; 522/111
[58] Field of Search ........................ 526/125, 124, 137

[56] References Cited

U.S. PATENT DOCUMENTS

| | | | |
|---|---|---|---|
| 4,301,029 | 11/1981 | Caunt et al. | 526/137 X |
| 4,397,762 | 8/1983 | Johnstone | 526/124 X |
| 4,468,477 | 8/1984 | Caunt et al. | 526/137 X |
| 4,673,661 | 6/1987 | Lofgren et al. | 526/125 X |
| 4,814,309 | 3/1989 | Seppanen et al. | 526/125 X |

FOREIGN PATENT DOCUMENTS 32309  7/1981  European Pat. Off. ............ 502/119

*Primary Examiner*—Patrick P. Garvin
*Attorney, Agent, or Firm*—Steinberg & Raskin

[57] ABSTRACT

Catalyst for polymerization of α-olefines, comprising an organoaluminum compound, an electron donor, as well as a solid catalyst component which is obtained when a compound containing magnesium reacts with a titanium halogen compound. A method for producing the catalyst is also provided. The catalyst component is manufactured by reacting with a titanium halogen compound in the presence of an internal electron donor, a solid catalyst component which has been produced by the steps of (a) reacting a magnesium alkyl compound with a chlorinating compound,
(b) dissolving the chlorinated magnesium alkyl compound in alcohol, after possible washing,
(c) adding into the solution, magnesium silicate which has been calcinated by heating at about 200°–600° C.,
(d) adding the mixture obtained in step (c) into a cold medium, to precipitate the magnesium compound into and onto the magnesium silicate carrier, and
(e) separating the thus-obtained solid carrier component.

4 Claims, No Drawings

METHOD OF POLMERIZING OLEFINES

This is a continuation of application Ser. No. 102,137, filed 9/29/87 and now U.S. Pat. No. 4,814,309.

BACKGROUND OF THE INVENTION

The present invention concerns a catalyst component for polymerization catalysts of α-olefines, such catalysts comprising an organaluminum compound, an electron donor, and a solid catalyst component. More particularly, the solid catalyst component is obtained when a component or compound containing magnesium reacts with a titanium halogen compound. The present invention also concerns a method for producing these catalyst components, as well as a method for polymerizing α-olefines, especially propylene, utilizing these thus-produced catalyst components.

High-activity catalysts which are produced from an aluminum alkyl compound, an electron donor, and a halogenated titanium compound on a solid carrier containing various magnesium compounds, are known for polymerizing α-olefines. The most commonly used magnesium compound is anhydrous magnesium chloride, either alone or together with other magnesium compounds, or organic magnesium compound manufactured by halogenating organic magnesium compounds with compounds containing chlorine. The magnesium compound may also be included in the solid carrier component for which silica is most commonly used.

In these types of polymerization catalysts, the properties of the solid carrier component have significant influence upon the properties of the final catalyst, e.g. on the activity thereof. These properties can be essentially influenced by the method of producing the carrier components.

It has been noted in the present invention, that when polymerizing α-olefines, especially propylene, it is possible to obtain considerably better yields and isotactic values, if silica is replaced by magnesium silicate as the solid carrier component, and further, if certain procedures are adopted in the manufacturing of the catalyst component.

The use of magnesium silicate in Ziegler-Natta catalysts, is known in and of itself. Thus, for example, according to the method presented in British patent publication No. 2,082,602, magnesium alkyl is dissolved or suspended into an inert hydrocabon solvent, with magnesium silicate being added, after which the obtained solid catalyst compound is washed and treated with titanium tetrachloride. The thus-produced catalyst is used in the homopolymerization and copolymerization of ethylene.

In the method presented in DE patent publication No. 3,011,326, magnesium halide, e.g. magnesium chloride, is dissolved in ethanol, with magnesium silicate treated with a chlorinating agent being added into the produced solution. The magnesium halide is precipitated by adding the mixture into a hydrocarbon solvent, e.g. heptane, with the thus-obtained component being treated with titanium tetrachloride. The thus-produced catalyst has been also applied in the polymerization of propylene, however the isotactic value obtained for the polymer in this method ranges between 92–93%.

SUMMARY OF THE INVENTION

Accordingly, it is an object of the present invention to improve the polymerizing of α-olefines, especially propylene.

It is a more specific object of the present invention to improve yield and isotactic value in the polymerizing of the α-olefines.

It is also an object of the present invention to provide a new and improved catalyst for the polymerizing of α-olefines, notably propylene.

It is an additional object of the present invention to provide a new and improved catalyst or carrier component for effecting polymerizing of the α-olefines.

These and other objects are attained by the present invention which is directed to a catalyst component for polymerizing α-olefines. The catalyst component is prepared by the steps of (a) reacting a magnesium alkyl compound with a chlorinating compound.

(b) dissolving the thus-formed chlorinated magnesium alkyl compound in alcohol.

(c) adding magnesium silicate which has been calcinated by heating at about 200°–600° C., to the thus-formed solution, (d) adding the resulting mixture obtained in step (c) into a cold medium, thereby precipitating the chlorinated magnesium alkyl compound into and onto the magnesium silicate, and (e) separating the obtained solid catalyst component. The present invention is also directed to a method for producing a catalyst component for polymerizing α-olefines, comprising steps (a)–(e) listed above.

The catalyst provided by the present invention is applied in manufacturing stereospecific polymers, especially polypropylene, so that the isotactic values are high, up to over 96%. In particular, the catalyst component of the present invention is manufactured by reacting with a titanium halogen compound in the presence of an internal electron donor, a solid catalyst component which has been produced by the steps of (a) reacting a magnesium alkyl compound with a chlorinating compound, (b) dissolving the chlorinated magnesium alkyl compound in alcohol after optional washing.

(c) adding magnesium silicate which has been calcinated by heating at about 200°–600° C., into the solution, (d) adding the mixture obtained in step (c) into a cold medium, to precipitate the magnesium compound into and onto the magnesium silicate carrier, and (e) separating the thus-obtained solid carrier component.

The present invention also concerns a method for producing catalyst components for such polymerization catalysts of α-olefines which comprise an organoaluminum compound, an external electron donor, and a solid magnesium-containing catalyst component which has been produced when a solid carrier component containing magnesium reacts with a titanium halogen compound. The method of the present invention for producing the catalyst component, comprises the steps of (a) reacting a magnesium alkyl compound with a chlorinating compound.

(b) dissolving the chlorinated magnesium alkyl compound in alcohol (after possible washing), (c) adding magnesium silicate which has been calcinated by heating at about 200°–600° C., into the solution produced in step (b), (d) adding the mixture obtained in step (c) into a cold medium, to precipitate the magnesium component into and onto the magnesium silicate carrier, (e) separating the obtained solid carrier component, and (f) reacting the solid carrier component separated in step (e) with a titanium halogen compound in the presence of an internal electron donor.

DESCRIPTION OF THE PREFERRED EMBODIMENTS

The magnesium silicate used in step (c) when producing the catalyst component of the present invention, is preferably a well-mixed mixture of silica and magnesium oxide, or a coprecipitate of silica and magnesium oxide. The manufacture of a coprecipitated silicon magnesium oxide (magnesium silicate) is well-known in the field. Coprecipitation of silica and magnesium oxide are commercially available. Silica and magnesium oxide can be effectively mixed by, e.g., grinding a mixture of these two oxides in a ball mill.

Another method for preparing a suitable magnesium silicate, is heating up of a mixture containing particles of silica or alkali metal silicate and a magnesium compound. When heated, these ingredients precipitate into magnesium silicate. Examples of magnesium compounds which can be heated up in this manner with silica or alkali metal silicate, include magnesium alkoxides, magnesium hydroxide, magnesium carbonate, magnesium sulfate, magnesium chloride, and magnesium nitrate. In the present invention, magnesium silicate precipitated from magnesium sulfate or magnesium chloride and sodium silicate, is preferably used as a carrier.

Magnesium silicate is calcinated before using as a catalyst component. The calcination can be performed by heating up the magnesium silicate up at about 200°–600° C., for abut 2–16 hours.

All reactants must be dry and treated with nitrogen (moisture and oxygen contend <10 ppm) when preparing a carrier component according to the present invention.

The magnesium alkyl compound used as a reactant in the catalyst component of the present invention, is usually in the form of MgR′$_2$ or MgR′R″ where R′ and R″ are either the same or different and contain alkyls from $C_1$ to $C_{20}$, preferably $C_2$–$C_{12}$. The magnesium compound can be, for example, diethyl magnesium, ethyl-butyl magnesium, ethyl-hexyl magnesium, ethyl-octyl magnesium, dibutyl magnesium, butyl-hexyl magnesium, butyl-octyl magnesium, dihexyl magnesium, hexyl-octyl magnesium, dioctyl magnesium, etc. The most preferred of these magnesium alkyl compounds, is butyl-octyl magnesium.

The chlorinating agents may be selected from the group consisting of chlorine, hydrogen chloride, alkyl chloride (e.g. butyl-chloride), TiCl$_4$, and mixtures thereof. The chlorination can be performed at a temperature of about $-10°$ to 100° C., preferably at about 10°–60° C. After the chlorination, the reaction mixture can be treated with nitrogen for about 15–60 minutes, to ensure complete chlorination.

The chlorinated magnesium alkyl compound can be treated with a small amount of alcohol, but even without the alcohol treatment the finished catalyst may prove highly active. The alcohol may either aliphatic or aromatic, and may contain one or several hydroxyl groups, such as, e.g., methanol, ethanol, 2-ethyl hexanol. If the alcohol treatment is performed, the precipitate can be washed several times with a hydrocarbon solvent, and the surplus solvent evaporated off by means of a nitrogen flow. After this step, the precipitate is dissolved in ethanol and the magnesium silicate carrier which has been calcinated by heating up for about two hours at a temperature of about 600° C., is added to the solution. The carrier is allowed to be impregnated in this solution at a temperature of about 60°–70° C. Normally, a treatment time of about 3–24 hours is sufficient.

The magnesium silicate carrier with its impregnation solution is siphoned into a cold (under about 0° C.) hydrocarbon solvent, in which the magnesium compound of the solution immediately precipitates into the pores and on the surface of the magnesium silicate carrier. The solvent temperature may vary between about $-30$ to $-5°$ C. The obtained carrier component is washed several times with a hydrocarbon solvent. After the washing, the carrier component is treated with titanium tetrachloride by a method known in and of itself, in order to further produce a catalyst component.

The titanium treatment may take place, e.g. in a manner such that the solid carrier component is allowed to react with titanium tetrachloride either once or several times. The catalyst component may be additionally treated in the presence of an internal electron donor compound before, during, or after the titanium treatment. Titanium treatment should preferably take place in two stages so that in the first stage, an internal electron donor compound, usually of the amine, ether, or ester type, is added. A suitable donor is, e.g., di-isobutyl phthalate.

In the first stage, a low temperature, e.g. under about 0° C., preferably under about $-20°$ C., is recommendably used. The temperature is raised during the titanium treatment to about 90°–110° C. The second titanium treatment is performed at a temperature of about 90°–110° C. for about 1–2 hours. The solid reaction product is separated from the liquid phase and washed with hydrocarbon solvent to remove impurities and derivations. The catalyst component is dried with nitrogen gas at room temperature or at slightly higher temperature.

The catalyst component introduced by the present invention can be used to polymerize α-olefines by allowing the catalyst component to come into contact with an Al-compound and an external electron donor. Amines, ethers, esters (preferably alkyl or aryl esters or aromatic carboxylic acids), or silane compounds (aryl-/alkyl silanes) such as methyl or ethyl esters of benzoic acid, toluene acid, and phthalic acid, isobutyl esters of phthalic acid, triethoxy silane, etc., can be used, among others, as the external electron donor. The noted electron donors are compounds that are capable of forming complexes with Al-alkyls. These can be used to improve the stereospecific properties of the catalyst. The external electron donor and the Al-alkyl are mixed together with a molar ratio of electron donor and Al-alkyl being about 10–30, and the Al/Ti molar ratio being about 10–300 depending on the polymerization system.

The polymerization can be carried out either as slurry, bulk, or gas phase polymerization. Catalyst components and catalyst produced according to the present invention can be used in the polymerizing of α-olefines such as propylene, by slurry, bulk, or gas phase methods.

The present invention will be further described by way of the following demonstrative examples:

EXAMPLE 1

60 ml. of magnesium alkyl (butyl-octyl magnesium as a 20% heptane solution) and 60 ml of heptane were measured into a fivenecked flask which was provided with a mechanical stirrer, a reflux condenser, a gas supply valve and a thermometer. The suspension was treated with nitrogen and maintained under inert conditions throughout the manufacturing process. The mixture was then chlorinated with chlorine gas at a rate of 0.25 l/min. for 10-25 min. and at a temperature of of 10°-56° C.

After this, the mixture was treated with nitrogen for 30 min., heated up to 94°-98° C., with 20 ml. of ethanol being added, upon which the chlorinated precipitate thickened. The precipitate was washed twice with 250 ml. of heptane, with excess solvent being evaporated by means of nitrogen flow, after the washings. The precipitate was dissolved into 45 ml. of ethanol at 80° C., with 5-6 g of magnesium silicate that had been calcinated by heating up for two hours at 600° C. and cooled down under nitrogen, being added to the solution, in addition to 5 ml. of ethanol being added.

The mixture was stirred at 70° C. overnight. The hot mixture was siphoned into cold ($-20°$ C.) heptane, upon which the dissolved magnesium component precipitated into the pores and onto the surface of the magnesium silicate. The solid component was twice washed with heptane at room temperature and was then cooled down to $-25°$ C., with 200 ml. of titanium tetrachloride being added at this temperature. After this, the temperature of the mixture was allowed to rise to room temperature, at which temperature 3 ml. of di-isobutyl phthalate was added. The temperature was raised to 100°-110° C., and the mixture was stirred for 60 min.

After the precipitate had sedimented, the solution was removed by siphoning. The titanium tetrachloride treatment was repeated with 200 ml. of titanium tetrachloride at 100°-110° C. for 60 min.

After the precipitate sedimented and the solution had been siphoned, the finished catalyst component was washed several times (5-6 times at a temperature of 80° C.) with heptane, and dried in a nitrogen flow. The catalyst component contained Mg 9.5%, Ti 3.0%, Si 10.2%, and Cl 26.0%.

The catalyst component manufactured in the above-described method was used in the polymerization of propylene by adding into a 2 l. polymerization reactor, a catalyst that had been prepared by mixing triethyl aluminum as aluminum alkyl and diphenyl dimethoxy silane as Lewis compound (Al/donor molar ratio 20) with 50 ml. of heptane, and then after five minutes, adding a catalyst component into this mixture so that the Al/Ti molar ratio was 200. The polymerization was performed under the following conditions: propylene partial pressure 9.0 bar, hydrogen partial pressure 0.3 bar, temperature 70° C. and polymerization time 3 h.

The catalyst polymerization activity was found to be 3.8 kg PP/g cat. 3 h, i.e. 127.0 kg PP/g Ti. The polymer isotacticity was found to be 96.0% and bulk density 0.28 g/min.

EXAMPLE 2

The catalyst component was produced as in Example 1, however the magnesium silicate that was utilized had been calcinated for 4 hours at 400° C. and cooled down in nitrogen flow. The catalyst component contained Mg 9.0%, Ti 3.3%, Si 11.3% and Cl 20.0%. The catalyst polymerization activity was found to be 4.4 kg PP/g cat. 3 h, i.e. 134.0 kg PP/g Ti. The polymer isotacticity was found to be 96.4%.

EXAMPLE 3

The catalyst component was produced as in Example 1, however the magnesium silicate utilized was calcinated for 4 hours at 200° C. and cooled down in nitrogen flow. The catalyst component contained Mg 10.0%, Ti 3.3%, Si 13.3% and Cl 28.0%. The catalyst polymerization activity was found to be 5.6 kg PP/g cat. 3 h, i.e. 169 kg PP/g Ti. The polymer isotacticity was found to be 96.3% and the bulk density 0.23 g/ml.

COMPARATIVE EXAMPLE

The catalyst component was produced as in Example 1, however magnesium silicate was replaced with a commercial silica ($SiO_2$- Davison 952). The catalyst component contained Mg 6.0%, Ti 4.0%, Si 22.0% and Cl 26.0%. The catalyst polymerization activity was found to be 3.3 kg PP/g cat. 3 h. The polymer isotacticity was found to be 78.8% and bulk density 0.32 g/ml.

This test shows that the polymer isotacticity is very low, when using a silica carrier. Also, improvement in the isotactic value, is evident with the present invention, when compared with polymers produced according to DE patent publication No. 3,011,326.

The preceding description of the present invention is merely exemplary, and is not intended to limit the scope thereof in any way.

We claim:
1. Method for the polymerization of α-olefines, which comprises subjecting an α-olefine to polymerization under polymerization conditions in contact with a catalyst component, an external electron donor and an organoaluminum compound, said catalyst component being prepared by the steps of
    (a) reacting a magnesium alkyl compound with chlorine gas,
    (b) dissolving the thus formed chlorinated magnesium alkyl compound in alcohol,
    (c) adding magnesium silicate which has been calcinated by heating it about 200°-600° C., to the thus formed solution,
    (d) adding the resulting mixture obtained in step (c) into a hydrocarbon medium at a temperature under about 0° C., thereby precipitating the chlorinated magnesium alkyl compound into and onto the magnesium silicate.
    (e) separating the obtained solid catalyst component, and
    (f) reacting the thus obtained solid catalyst component with a titanium halogen compound in the presence of an internal electron donor, whereby the resulting catalyst component acts as a catalyst for the polymerization of said α-olefine.

2. Method according to claim 1 wherein the catalyst component obtained in step (f) is contacted with said organoaluminum compound and an external electron donor prior to the use of the catalyst component in the polymerization of said α-olefine.

3. Method according to claim 1 wherein said α-olefine is propylene.

4. Method according to claim 2 wherein said α-olefine is propylene.

* * * * *